US007784689B2

(12) United States Patent
Linton et al.

(10) Patent No.: US 7,784,689 B2
(45) Date of Patent: Aug. 31, 2010

(54) RADIO FREQUENCY IDENTIFICATION METHOD AND SYSTEM OF DISTRIBUTING PRODUCTS

(75) Inventors: William A. Linton, Madison, WI (US); John Linton, Madison, WI (US); Julia E. Krueger, Deerfield, WI (US); Michael P. Dearing, Spring Green, WI (US)

(73) Assignee: Promega Corporation, Madison, WI (US)

( * ) Notice: Subject to any disclaimer, the term of this patent is extended or adjusted under 35 U.S.C. 154(b) by 385 days.

(21) Appl. No.: 11/381,849

(22) Filed: May 5, 2006

(65) Prior Publication Data
US 2006/0190628 A1    Aug. 24, 2006

Related U.S. Application Data

(62) Division of application No. 09/981,219, filed on Oct. 16, 2001, now Pat. No. 7,258,276.
(60) Provisional application No. 60/241,907, filed on Oct. 20, 2000.

(51) Int. Cl.
*G06Q 90/00* (2006.01)
*G06F 17/00* (2006.01)

(52) U.S. Cl. ..................... 235/385; 700/237
(58) Field of Classification Search ............. 235/380, 235/381; 709/217, 219, 229; 70/460; 700/237
See application file for complete search history.

(56) References Cited

U.S. PATENT DOCUMENTS 3,827,053 A    7/1974    Willie et al. ............ 343/701

(Continued)

FOREIGN PATENT DOCUMENTS

AU    2002211769    3/2007

(Continued)

OTHER PUBLICATIONS

Sep. 20, 2006 Communication in Russian Application No. 2004128075/09(030475) (with English-language translation).

(Continued)

*Primary Examiner*—Wing F Chan
*Assistant Examiner*—Jonathan Willis
(74) *Attorney, Agent, or Firm*—Michael Best & Friedrich LLP

(57) ABSTRACT

A method and system for vending products from a defined area, such as a micro-warehouse with a door. The method includes fitting each product with a radio frequency identification tag, positioning the plurality of products in a micro-warehouse, sensing opening and closing of the micro-warehouse door, scanning the plurality of products in the micro-warehouse upon sensing closing of the door to determine the number and type of products in the micro-warehouse, generating a message based on the number and type of products in the micro-warehouse, transmitting the message to a remote processor or server, and maintaining an inventory in the remote processor based on the message.

The system is designed to be accessed by authorized individuals possessing some type of code or identifying mechanism. The micro-warehouses may be cabinets, refrigerators, secured rooms, or similar storage units or areas. Each micro-warehouse has an output device such as a light or display, a door, an antenna mounted on or in the micro-warehouse, and a controller coupled to the antenna. Using a signal from the antenna or other input device, the controller is operable to check the identity of the individual accessing the micro-warehouse. If the user is authorized, the controller opens the door and the user may remove products from the micro-warehouse. Once the user closes the door, the controller performs a scan of the products remaining in the micro-warehouse to determine the identity of each of the products. The controller then generates a message including the identity of each of the products, and sends that message to the server.

15 Claims, 5 Drawing Sheets

U.S. PATENT DOCUMENTS

| | | | |
|---|---|---|---|
| 3,861,433 A | 1/1975 | Schier et al. ................. 150/0.5 |
| 3,918,671 A | 11/1975 | Mizusawa ................... 248/285 |
| 4,116,512 A | 9/1978 | Wiser ...................... 312/330.1 |
| 4,118,693 A | 10/1978 | Novikoff .................... 340/572 |
| 4,223,830 A | 9/1980 | Walton ....................... 235/380 |
| 4,227,037 A | 10/1980 | Layton |
| 4,354,613 A | 10/1982 | Desai et al. .................... 221/4 |
| 4,414,690 A | 11/1983 | Nordholt et al. ............ 455/283 |
| 4,496,406 A | 1/1985 | Dedow |
| 4,580,041 A | 4/1986 | Walton ....................... 235/380 |
| 4,616,694 A | 10/1986 | Hseih .......................... 165/47 |
| 4,636,634 A | 1/1987 | Harper et al. ............ 250/223 R |
| 4,636,950 A | 1/1987 | Caswell et al. .............. 364/403 |
| 4,639,875 A | 1/1987 | Abraham et al. ............ 364/479 |
| 4,656,463 A | 4/1987 | Anders et al. ............... 340/572 |
| 4,688,026 A | 8/1987 | Scribner et al. ............. 340/572 |
| 4,694,283 A | 9/1987 | Reeb .......................... 340/572 |
| 4,746,830 A | 5/1988 | Holland .................. 310/313 D |
| 4,785,969 A | 11/1988 | McLaughlin .................... 221/2 |
| 4,805,207 A * | 2/1989 | McNutt et al. ........... 379/88.25 |
| 4,837,568 A | 6/1989 | Snaper .................. 340/825.54 |
| 4,847,764 A | 7/1989 | Halvorson ............. 364/413.02 |
| 4,860,918 A | 8/1989 | Wuyten et al. |
| 4,862,160 A | 8/1989 | Ekchian et al. ........ 340/825.54 |
| 4,866,661 A * | 9/1989 | de Prins ...................... 235/382 |
| 4,881,061 A | 11/1989 | Chambers ................... 340/568 |
| 4,961,533 A | 10/1990 | Teller et al. ............... 177/25.19 |
| 5,008,814 A | 4/1991 | Mathur ....................... 364/200 |
| 5,014,875 A | 5/1991 | McLaughlin et al. ........... 221/2 |
| 5,019,815 A | 5/1991 | Lemelson et al. ........... 340/933 |
| 5,021,800 A | 6/1991 | Rilling ....................... 343/820 |
| 5,030,807 A | 7/1991 | Landt et al. ................. 235/375 |
| 5,036,308 A | 7/1991 | Fockens .................... 340/572 |
| 5,038,023 A | 8/1991 | Saliga ........................ 235/385 |
| 5,091,713 A | 2/1992 | Horne et al. ................ 340/541 |
| 5,099,226 A | 3/1992 | Andrews .................... 340/572 |
| 5,103,222 A | 4/1992 | Hogen Esch et al. ... 340/825.54 |
| 5,117,407 A | 5/1992 | Vogel .......................... 369/30 |
| 5,144,314 A | 9/1992 | Malmberg et al. ............. 342/44 |
| 5,155,847 A | 10/1992 | Kirouac et al. ............... 395/600 |
| 5,194,856 A | 3/1993 | Zijlstra ................. 340/825.35 |
| 5,208,599 A | 5/1993 | Rudduck et al. ................ 342/4 |
| 5,214,409 A | 5/1993 | Beigel ........................ 340/572 |
| 5,231,844 A | 8/1993 | Park ............................ 62/80 |
| 5,240,139 A | 8/1993 | Chirnomas .................... 221/2 |
| 5,260,690 A | 11/1993 | Mann et al. ................. 340/572 |
| 5,266,925 A | 11/1993 | Vercellotti et al. .......... 340/572 |
| 5,285,041 A | 2/1994 | Wright ....................... 219/717 |
| 5,287,414 A | 2/1994 | Foster ........................... 382/1 |
| 5,294,931 A | 3/1994 | Meier ........................... 342/44 |
| 5,327,118 A | 7/1994 | Drucker et al. ............... 340/572 |
| 5,335,509 A | 8/1994 | Namisniak et al. ............. 62/125 |
| 5,365,551 A | 11/1994 | Snodgrass et al. ............... 375/1 |
| 5,389,919 A | 2/1995 | Warren et al. .......... 340/825.31 |
| 5,392,025 A | 2/1995 | Figh et al. .................... 340/545 |
| 5,408,443 A | 4/1995 | Weinberger ................... 368/10 |
| 5,410,315 A | 4/1995 | Huber ......................... 342/42 |
| 5,421,009 A | 5/1995 | Platt .......................... 395/600 |
| 5,424,858 A | 6/1995 | Gillotte ...................... 359/143 |
| 5,431,299 A | 7/1995 | Brewer et al. ................... 221/2 |
| 5,446,447 A | 8/1995 | Carney et al. ............... 340/572 |
| 5,450,070 A | 9/1995 | Massar et al. ........... 340/825.35 |
| 5,460,294 A | 10/1995 | Williams ....................... 221/2 |
| 5,471,203 A | 11/1995 | Sasaki et al. ........... 340/825.31 |
| 5,478,990 A | 12/1995 | Montanari et al. |
| 5,487,276 A | 1/1996 | Namisniak et al. ............. 62/125 |
| 5,487,764 A | 1/1996 | Ford, Jr. ....................... 44/553 |
| 5,489,908 A | 2/1996 | Orthmann et al. ............. 342/42 |
| 5,491,715 A | 2/1996 | Flaxl ......................... 375/344 |
| 5,495,961 A | 3/1996 | Maestre ........................ 221/3 |
| 5,500,650 A | 3/1996 | Snodgrass et al. ............ 342/42 |
| 5,519,381 A | 5/1996 | Marsh et al. ................. 340/572 |
| 5,520,450 A | 5/1996 | Colson, Jr. et al. .......... 312/215 |
| 5,521,601 A | 5/1996 | Kandlur et al. ................. 342/44 |
| 5,528,222 A | 6/1996 | Moskowitz et al. .......... 340/572 |
| 5,528,232 A | 6/1996 | Verma et al. ............ 340/825.54 |
| 5,530,702 A | 6/1996 | Palmer et al. ................ 370/85.3 |
| 5,537,105 A | 7/1996 | Marsh et al. ............ 340/825.54 |
| 5,539,394 A | 7/1996 | Cato et al. ............... 340/825.54 |
| 5,541,604 A | 7/1996 | Meier ........................... 342/42 |
| 5,550,547 A | 8/1996 | Chan et al. .................... 342/42 |
| 5,557,280 A | 9/1996 | Marsh et al. ................... 342/44 |
| 5,564,803 A | 10/1996 | McDonald et al. ............ 312/215 |
| 5,565,858 A | 10/1996 | Guthrie |
| 5,573,082 A * | 11/1996 | Conlan et al. .................. 186/44 |
| 5,583,819 A | 12/1996 | Roesner et al. ........... 365/225.7 |
| 5,600,121 A | 2/1997 | Kahn et al. .................. 235/472 |
| 5,602,538 A | 2/1997 | Orthmann et al. ....... 340/825.54 |
| 5,606,902 A | 3/1997 | Hosono et al. .................. 92/88 |
| 5,608,298 A * | 3/1997 | Frolov et al. ................. 318/286 |
| 5,608,739 A | 3/1997 | Snodgrass et al. ........... 371/37.1 |
| 5,621,199 A | 4/1997 | Calari et al. ................. 235/375 |
| 5,627,517 A | 5/1997 | Theimer et al. .............. 340/572 |
| 5,627,544 A | 5/1997 | Snodgrass et al. ............. 342/42 |
| 5,629,981 A * | 5/1997 | Nerlikar ...................... 713/168 |
| 5,648,765 A | 7/1997 | Cresap et al. ........... 340/825.35 |
| 5,648,767 A | 7/1997 | O'Connor et al. ............ 340/928 |
| 5,680,459 A | 10/1997 | Hook et al. .................... 380/23 |
| 5,686,902 A | 11/1997 | Reis et al. ............... 340/825.54 |
| 5,689,238 A | 11/1997 | Cannon, Jr. et al. .......... 340/568 |
| 5,699,066 A | 12/1997 | Marsh et al. ................... 342/44 |
| 5,701,252 A | 12/1997 | Facchin et al. ............... 364/479 |
| 5,703,347 A | 12/1997 | Reddersen et al. ........... 235/472 |
| 5,708,423 A | 1/1998 | Ghaffari et al. ......... 340/825.35 |
| 5,711,160 A | 1/1998 | Namisniak et al. ............. 62/125 |
| 5,713,485 A | 2/1998 | Liff et al. ........................ 221/2 |
| RE35,743 E | 3/1998 | Pearson ......................... 221/2 |
| 5,726,630 A | 3/1998 | Marsh et al. ................. 340/572 |
| 5,739,765 A | 4/1998 | Stanfield et al. |
| 5,742,618 A | 4/1998 | Lowe ........................... 371/36 |
| 5,745,036 A | 4/1998 | Clare .......................... 340/572 |
| 5,745,366 A | 4/1998 | Higham et al. .......... 364/479.12 |
| 5,751,221 A | 5/1998 | Stanfield et al. ......... 340/825.35 |
| 5,764,992 A | 6/1998 | Kullick et al. ................ 395/712 |
| 5,765,707 A | 6/1998 | Kenevan |
| 5,771,003 A | 6/1998 | Seymour |
| 5,774,053 A | 6/1998 | Porter ......................... 340/568 |
| 5,774,059 A | 6/1998 | Henry et al. |
| 5,774,876 A | 6/1998 | Woolley et al. ................. 705/28 |
| 5,777,561 A | 7/1998 | Chieu et al. ............. 340/825.54 |
| 5,786,763 A | 7/1998 | Canipe ....................... 340/572 |
| 5,787,174 A | 7/1998 | Tuttle ........................... 380/23 |
| H1743 H | 8/1998 | Graves et al. ........... 364/479.06 |
| 5,797,515 A | 8/1998 | Liff et al. ........................ 221/2 |
| 5,798,693 A | 8/1998 | Engellenner ................. 340/505 |
| 5,798,694 A | 8/1998 | Reber et al. .................. 340/540 |
| 5,801,628 A | 9/1998 | Maloney .................... 340/568.2 |
| 5,805,455 A | 9/1998 | Lipps .................... 364/479.01 |
| 5,805,456 A | 9/1998 | Higham et al. .......... 364/479.06 |
| 5,805,897 A | 9/1998 | Glowny ...................... 395/712 |
| 5,809,230 A * | 9/1998 | Pereira ......................... 726/35 |
| 5,818,348 A | 10/1998 | Walczak et al. ......... 340/825.54 |
| 5,822,692 A * | 10/1998 | Krishan et al. ............... 455/419 |
| 5,822,714 A | 10/1998 | Cato ........................... 702/108 |
| 5,825,806 A | 10/1998 | Tuttle et al. ................. 375/200 |
| 5,831,531 A | 11/1998 | Tuttle ......................... 340/572 |
| 5,836,618 A | 11/1998 | Perlman ........................ 283/70 |
| 5,841,770 A | 11/1998 | Snodgrass et al. ........... 370/346 |
| 5,842,118 A | 11/1998 | Wood, Jr. .................... 455/101 |
| 5,842,976 A | 12/1998 | Williamson ................. 600/300 |
| 5,852,911 A | 12/1998 | Yuyama et al. ................ 53/168 |
| 5,857,152 A | 1/1999 | Everett ........................ 455/406 |
| 5,883,582 A | 3/1999 | Bowers et al. .......... 340/825.54 |
| 5,886,634 A | 3/1999 | Muhme ...................... 340/572 |

| Patent No. | Date | Inventor | Class |
|---|---|---|---|
| 5,887,176 A | 3/1999 | Griffith et al. | 395/750 |
| 5,889,474 A | 3/1999 | LaDue | 340/825.49 |
| 5,892,441 A | 4/1999 | Woolley et al. | 340/539 |
| 5,894,266 A | 4/1999 | Wood, Jr. et al. | 340/539 |
| 5,902,984 A | 5/1999 | Planke | 235/381 |
| 5,902,991 A | 5/1999 | Kumar | 235/492 |
| 5,905,653 A | 5/1999 | Higham et al. | 364/479.14 |
| 5,906,228 A | 5/1999 | Keller | 141/94 |
| 5,909,581 A | 6/1999 | Park | 395/712 |
| 5,910,776 A | 6/1999 | Black | 340/825.35 |
| 5,912,818 A | 6/1999 | McGrady et al. | 364/479.02 |
| 5,923,001 A | 7/1999 | Morris et al. | 177/245 |
| 5,923,300 A | 7/1999 | Mejia | 343/788 |
| 5,927,540 A | 7/1999 | Godlewski | 221/2 |
| 5,929,779 A | 7/1999 | MacLellan et al. | 340/825.54 |
| 5,929,801 A | 7/1999 | Aslanidis et al. | 342/44 |
| 5,930,145 A | 7/1999 | Yuyama et al. | 364/479.01 |
| 5,930,766 A | 7/1999 | Gibb | 705/15 |
| 5,936,527 A | 8/1999 | Isaacman et al. | 340/572.1 |
| 5,949,335 A | 9/1999 | Maynard | 340/572.1 |
| 5,950,630 A | 9/1999 | Portwood et al. | 128/897 |
| 5,955,298 A * | 9/1999 | Thomashow et al. | 435/69.1 |
| 5,955,950 A | 9/1999 | Gallagher, III et al. | 340/572.1 |
| 5,955,951 A | 9/1999 | Wischerop et al. | 340/572.8 |
| 5,959,531 A | 9/1999 | Gallagher, III et al. | 340/572.1 |
| 5,959,568 A | 9/1999 | Woolley | 342/42 |
| 5,959,606 A | 9/1999 | Goodman et al. | |
| 5,960,048 A | 9/1999 | Haartsen | 375/366 |
| 5,963,134 A | 10/1999 | Bowers et al. | 340/572.1 |
| 5,963,144 A | 10/1999 | Kruest | 340/825.54 |
| 5,969,606 A | 10/1999 | Reber et al. | 340/540 |
| 5,971,277 A | 10/1999 | Cragun et al. | 235/462.01 |
| 5,974,454 A | 10/1999 | Apfel et al. | 709/221 |
| 5,977,875 A | 11/1999 | Lin et al. | 340/570 |
| 5,979,941 A | 11/1999 | Mosher, Jr. et al. | 283/67 |
| 5,986,570 A | 11/1999 | Black et al. | 340/825.54 |
| 5,990,794 A | 11/1999 | Alicot et al. | 340/573.1 |
| 5,993,046 A | 11/1999 | McGrady et al. | 364/479.01 |
| 5,995,019 A | 11/1999 | Chieu et al. | 340/825.54 |
| 5,995,898 A | 11/1999 | Tuttle | 701/102 |
| 5,999,091 A | 12/1999 | Wortham | 340/431 |
| 5,999,741 A | 12/1999 | May et al. | 395/712 |
| 5,999,808 A | 12/1999 | LaDue | 455/412 |
| 6,002,344 A | 12/1999 | Bandy et al. | 340/825.54 |
| 6,003,006 A | 12/1999 | Colella et al. | 705/2 |
| 6,006,034 A | 12/1999 | Heath et al. | 395/712 |
| 6,009,274 A | 12/1999 | Fletcher et al. | 395/712 |
| 6,011,243 A | 1/2000 | Arnold et al. | 291/506 |
| 6,011,999 A | 1/2000 | Holmes | 700/231 |
| 6,012,041 A | 1/2000 | Brewer et al. | 705/28 |
| 6,020,856 A | 2/2000 | Alicot | 343/742 |
| 6,021,392 A | 2/2000 | Lester et al. | 705/2 |
| 6,023,610 A | 2/2000 | Wood, Jr. | 455/101 |
| 6,025,780 A | 2/2000 | Bowers et al. | 340/572.3 |
| 6,031,459 A | 2/2000 | Lake | 340/572.8 |
| 6,034,603 A | 3/2000 | Steeves | 340/572.1 |
| 6,036,099 A * | 3/2000 | Leighton | 235/488 |
| 6,037,879 A | 3/2000 | Tuttle | 340/825.54 |
| 6,039,467 A | 3/2000 | Holmes | 364/479.01 |
| 6,040,773 A | 3/2000 | Vega et al. | 340/572.1 |
| 6,044,461 A | 3/2000 | Agha et al. | 713/1 |
| 6,056,199 A | 5/2000 | Wiklof et al. | 235/462.45 |
| 6,057,756 A | 5/2000 | Engellenner | 340/505 |
| 6,068,156 A | 5/2000 | Liff et al. | 221/7 |
| 6,069,564 A | 5/2000 | Hatano et al. | 340/572.7 |
| 6,070,012 A | 5/2000 | Eitner et al. | 395/712 |
| 6,070,070 A | 5/2000 | Ladue | 455/419 |
| 6,075,441 A | 6/2000 | Maloney | 340/568.1 |
| 6,088,431 A | 7/2000 | LaDue | 379/114 |
| 6,097,306 A * | 8/2000 | Leon et al. | 340/5.1 |
| 6,107,917 A | 8/2000 | Carrender et al. | 340/505 |
| 6,108,588 A | 8/2000 | McGrady | 700/231 |
| 6,112,152 A | 8/2000 | Tuttle | 701/115 |
| 6,112,502 A | 9/2000 | Frederick et al. | 53/411 |
| 6,116,461 A | 9/2000 | Broadfield et al. | 221/98 |
| 6,121,583 A | 9/2000 | Hansen | 219/401 |
| 6,121,880 A | 9/2000 | Scott et al. | 340/572.5 |
| 6,127,928 A | 10/2000 | Issacman et al. | 340/572.1 |
| 6,127,981 A | 10/2000 | Pritchett et al. | 343/711 |
| 6,131,399 A | 10/2000 | Hall | 62/127 |
| 6,131,812 A | 10/2000 | Schneider | 235/385 |
| 6,133,835 A | 10/2000 | De Leeuw et al. | 340/572.5 |
| 6,144,848 A | 11/2000 | Walsh et al. | 455/419 |
| 6,144,859 A | 11/2000 | LaDue | 455/511 |
| 6,147,601 A | 11/2000 | Sandelman et al. | 340/506 |
| 6,147,655 A | 11/2000 | Roesner | 343/741 |
| 6,147,662 A | 11/2000 | Grabau et al. | 343/895 |
| 6,151,536 A | 11/2000 | Arnold et al. | 700/237 |
| 6,152,364 A | 11/2000 | Schoonen et al. | 235/375 |
| 6,152,365 A | 11/2000 | Kolls | 235/381 |
| 6,154,790 A | 11/2000 | Pruett et al. | 710/15 |
| 6,160,477 A | 12/2000 | Sandelman et al. | 340/506 |
| 6,169,483 B1 | 1/2001 | Ghaffari et al. | 340/572.3 |
| 6,170,285 B1 | 1/2001 | Huffman et al. | 62/448 |
| 6,185,198 B1 | 2/2001 | LaDue | 370/329 |
| 6,202,925 B1 | 3/2001 | Machii et al. | 235/380 |
| 6,204,764 B1 | 3/2001 | Maloney | 340/568.1 |
| 6,211,782 B1 | 4/2001 | Sandelman et al. | 340/506 |
| 6,218,942 B1 | 4/2001 | Vega et al. | 340/572.1 |
| 6,223,984 B1 * | 5/2001 | Renner et al. | 235/380 |
| 6,229,443 B1 | 5/2001 | Roesner | 340/572.1 |
| 6,249,227 B1 | 6/2001 | Brady et al. | 340/572.1 |
| 6,260,049 B1 | 7/2001 | Fitzgerald et al. | 707/104 |
| 6,265,976 B1 | 7/2001 | Roesner | 340/572.4 |
| 6,272,394 B1 | 8/2001 | Lipps | 700/231 |
| 6,285,868 B1 | 9/2001 | LaDue | 455/410 |
| 6,294,999 B1 | 9/2001 | Yarin et al. | |
| 6,296,148 B1 | 10/2001 | Myers et al. | |
| 6,305,609 B1 | 10/2001 | Melzer et al. | 235/487 |
| 6,313,747 B2 | 11/2001 | Imaichi et al. | 340/572.1 |
| 6,327,576 B1 | 12/2001 | Ogasawara | 705/22 |
| 6,338,007 B1 | 1/2002 | Broadfield et al. | 700/231 |
| 6,339,732 B1 | 1/2002 | Phoon et al. | 700/237 |
| 6,351,215 B2 | 2/2002 | Rodgers et al. | 340/572.1 |
| 6,356,197 B1 | 3/2002 | Patterson et al. | 340/572.1 |
| 6,362,737 B1 | 3/2002 | Rodgers et al. | 340/572.1 |
| 6,375,780 B1 | 4/2002 | Tuttle et al. | 156/226 |
| 6,380,858 B1 | 4/2002 | Yarin et al. | |
| 6,385,505 B1 | 5/2002 | Lipps | 700/231 |
| 6,392,543 B2 | 5/2002 | Maloney | 340/568.1 |
| 6,392,544 B1 | 5/2002 | Collins et al. | |
| 6,393,339 B1 | 5/2002 | Yeadon | 700/237 |
| 6,407,665 B2 | 6/2002 | Maloney | 340/568.1 |
| 6,407,669 B1 | 6/2002 | Brown et al. | 340/572.1 |
| 6,424,260 B2 | 7/2002 | Maloney | 340/568.1 |
| 6,424,262 B2 | 7/2002 | Garber et al. | 340/572.3 |
| 6,427,913 B1 | 8/2002 | Maloney | 235/383 |
| 6,431,438 B1 | 8/2002 | Pires et al. | 235/375 |
| 6,445,297 B1 | 9/2002 | Nicholson | 340/572.7 |
| 6,451,154 B1 | 9/2002 | Grabau et al. | 156/300 |
| 6,462,661 B1 | 10/2002 | Pfeiffer et al. | 340/572.8 |
| 6,501,435 B1 | 12/2002 | King et al. | 343/795 |
| 6,512,459 B2 | 1/2003 | Benezech et al. | |
| 6,512,478 B1 | 1/2003 | Chien | 342/357.09 |
| 6,517,000 B1 | 2/2003 | McAllister et al. | 235/462.01 |
| 6,522,645 B1 | 2/2003 | Lee et al. | 370/352 |
| 6,529,446 B1 * | 3/2003 | de la Huerga | 368/10 |
| 6,532,399 B2 * | 3/2003 | Mase | 700/237 |
| 6,563,425 B2 | 5/2003 | Nicholson et al. | 340/572.7 |
| 6,568,596 B1 | 5/2003 | Shaw | 235/426.01 |
| 6,590,498 B2 | 7/2003 | Helms | 340/572.7 |
| 6,595,418 B1 | 7/2003 | Igarashi et al. | 235/385 |
| 6,600,420 B2 | 7/2003 | Goff et al. | 340/572.4 |
| 6,609,047 B1 | 8/2003 | Lipps | 700/231 |
| 6,639,509 B1 | 10/2003 | Martinez | 340/10.4 |
| 6,639,514 B1 | 10/2003 | Müller | 340/572.5 |

| Patent/Pub No. | Date | Inventor | Class |
|---|---|---|---|
| 6,640,159 B2 | 10/2003 | Holmes et al. | 700/244 |
| 6,664,895 B2 | 12/2003 | Zhu | 340/570 |
| 6,677,852 B1 | 1/2004 | Landt | 340/10.1 |
| 6,677,857 B2 | 1/2004 | Bara et al. | |
| 6,686,830 B1 | 2/2004 | Schirtzer | 340/10.2 |
| 6,693,539 B2 | 2/2004 | Bowers et al. | 340/572.1 |
| 6,700,491 B2 | 3/2004 | Shafer | 340/572.7 |
| 6,707,381 B1 | 3/2004 | Maloney | 340/568.1 |
| 6,714,121 B1 | 3/2004 | Moore | 340/10.3 |
| 6,717,154 B2 | 4/2004 | Black et al. | 250/393 |
| 6,758,802 B2 | 7/2004 | Fitzgerald et al. | 493/476 |
| 6,760,643 B2 | 7/2004 | Lipps | 700/231 |
| 6,761,637 B2 | 7/2004 | Weston et al. | 463/42 |
| 6,768,419 B2 | 7/2004 | Garber et al. | 340/572.4 |
| 6,771,766 B1 | 8/2004 | Shafiee et al. | 379/265.09 |
| 6,793,127 B2 | 9/2004 | Alsafadi et al. | 235/375 |
| 6,812,824 B1 | 11/2004 | Goldinger et al. | 340/10.1 |
| 6,830,181 B1 | 12/2004 | Bennett | 235/440 |
| 6,836,215 B1 | 12/2004 | Laurash et al. | 340/572.1 |
| 6,838,989 B1 | 1/2005 | Mays et al. | 340/572.1 |
| 6,839,604 B2 | 1/2005 | Godfrey et al. | 700/116 |
| 6,843,720 B2 | 1/2005 | Luciano et al. | |
| 6,859,757 B2 | 2/2005 | Muehl et al. | 702/184 |
| 6,883,710 B2 | 4/2005 | Chung | 235/385 |
| 6,892,520 B2 | 5/2005 | Rowse et al. | 56/377 |
| 6,892,545 B2 | 5/2005 | Ishikawa et al. | 62/126 |
| 6,908,034 B2 | 6/2005 | Alleshouse | 235/432 |
| 6,909,326 B2 | 6/2005 | Jesme | 330/251 |
| 6,970,141 B2 | 11/2005 | Copeland et al. | 343/866 |
| 6,975,834 B1 | 12/2005 | Forster | 455/2.72 |
| 6,982,640 B2 | 1/2006 | Lindsay et al. | 340/540 |
| 6,987,392 B1 | 1/2006 | Hernandez et al. | 324/627 |
| 6,989,749 B2 | 1/2006 | Mohr | 340/572.1 |
| 6,989,796 B2 | 1/2006 | Rahim | |
| 7,009,515 B2 | 3/2006 | Carrender | 340/572.1 |
| 7,020,680 B2 | 3/2006 | Defosse | |
| 7,031,803 B2 | 4/2006 | Eneau et al. | |
| 7,053,775 B2 | 5/2006 | Moore | 340/572.1 |
| 7,181,501 B2 | 2/2007 | Defosse | |
| 7,250,865 B2 | 7/2007 | Maloney | 340/572.1 |
| 7,258,276 B2 | 8/2007 | Linton et al. | |
| 7,268,742 B2 | 9/2007 | Rahim | |
| 7,293,705 B2 | 11/2007 | Linton et al. | |
| 7,315,247 B2 | 1/2008 | Jung et al. | |
| 7,389,916 B2 | 6/2008 | Chirnomas | |
| 2001/0000019 A1 | 3/2001 | Bowers et al. | 340/572.1 |
| 2001/0002448 A1 | 5/2001 | Wilson et al. | 700/233 |
| 2001/0011341 A1 | 8/2001 | Hayes Jr. et al. | 712/11 |
| 2001/0028308 A1 | 10/2001 | De La Huerga | 340/573.1 |
| 2001/0034259 A1 | 10/2001 | Luciano et al. | 463/16 |
| 2001/0034613 A1 | 10/2001 | Rubsamen | 705/2 |
| 2001/0044731 A1 | 11/2001 | Coffman et al. | 705/3 |
| 2001/0044804 A1 | 11/2001 | Fitzgerald et al. | 707/200 |
| 2001/0045893 A1 | 11/2001 | Swartzel et al. | 340/572.1 |
| 2001/0045894 A1 | 11/2001 | Slavin et al. | |
| 2001/0053980 A1 | 12/2001 | Suliman, Jr. et al. | 705/1 |
| 2002/0005774 A1 | 1/2002 | Rudolph et al. | |
| 2002/0011967 A1 | 1/2002 | Goff et al. | 343/895 |
| 2002/0013077 A1 | 1/2002 | Lepine et al. | 439/191 |
| 2002/0027507 A1 | 3/2002 | Yarin et al. | 340/573.1 |
| 2002/0038167 A1 | 3/2002 | Chirnomas | 700/231 |
| 2002/0040968 A1 | 4/2002 | Black et al. | 250/393 |
| 2002/0041234 A1 | 4/2002 | Kuzma et al. | 340/572.8 |
| 2002/0063622 A1 | 5/2002 | Armstrong et al. | 340/10.31 |
| 2002/0113082 A1 | 8/2002 | Leatherman et al. | |
| 2002/0130778 A1 | 9/2002 | Nicholson | |
| 2002/0130788 A1 | 9/2002 | Nicholson | 340/572.1 |
| 2002/0140966 A1 | 10/2002 | Meade et al. | 358/1.15 |
| 2002/0143320 A1 | 10/2002 | Levin | |
| 2002/0145036 A1 | 10/2002 | Otto | 235/383 |
| 2002/0145520 A1 | 10/2002 | Maloney | |
| 2002/0153411 A1 | 10/2002 | Wan et al. | |
| 2002/0167397 A1 | 11/2002 | Eroglu et al. | 340/10.6 |
| 2002/0180588 A1 | 12/2002 | Erickson et al. | 340/10.2 |
| 2002/0183882 A1 | 12/2002 | Dearing et al. | 700/115 |
| 2002/0190871 A1 | 12/2002 | Stanfield et al. | |
| 2002/0196126 A1 | 12/2002 | Eisenberg et al. | 340/10.2 |
| 2002/0198795 A1 | 12/2002 | Dorenbosch | |
| 2003/0006907 A1 | 1/2003 | Lovegreen et al. | 340/870.16 |
| 2003/0030539 A1 | 2/2003 | McGarry et al. | |
| 2003/0034390 A1 | 2/2003 | Linton et al. | 235/382 |
| 2003/0052783 A1 | 3/2003 | Sitzman | 340/572.7 |
| 2003/0074106 A1 | 4/2003 | Butler | |
| 2003/0117281 A1 | 6/2003 | Sriharto et al. | 340/568.1 |
| 2003/0171998 A1 | 9/2003 | Pujar et al. | 705/26 |
| 2003/0174046 A1 | 9/2003 | Abrams | 340/5.92 |
| 2003/0209601 A1 | 11/2003 | Chung | 235/385 |
| 2003/0216969 A1 | 11/2003 | Bauer et al. | 705/22 |
| 2004/0069850 A1 | 4/2004 | De Wilde | 235/385 |
| 2004/0100415 A1 | 5/2004 | Veitch et al. | 343/850 |
| 2004/0124988 A1 | 7/2004 | Leonard et al. | 340/612 |
| 2004/0212542 A1 | 10/2004 | Rahim | |
| 2004/0222298 A1 | 11/2004 | Dearing et al. | |
| 2004/0232230 A1 | 11/2004 | Linton et al. | |
| 2004/0232231 A1 | 11/2004 | Linton et al. | |
| 2004/0263316 A1 | 12/2004 | Dix et al. | 340/5.23 |
| 2005/0008376 A1 | 1/2005 | Parry et al. | 399/24 |
| 2005/0009122 A1 | 1/2005 | Whelan et al. | 435/7.32 |
| 2005/0040952 A1 | 2/2005 | Dearing et al. | |
| 2005/0088305 A1 | 4/2005 | Greene et al. | |
| 2005/0113138 A1 | 5/2005 | Mendolia et al. | 455/558 |
| 2005/0125312 A1 | 6/2005 | Dearing et al. | |
| 2005/0127177 A1 | 6/2005 | Dearing et al. | |
| 2005/0194437 A1 | 9/2005 | Dearing et al. | |
| 2005/0247782 A1 | 11/2005 | Ambartsoumian | 235/385 |
| 2006/0006999 A1 | 1/2006 | Walczyk et al. | 340/539.27 |
| 2006/0017634 A1 | 1/2006 | Meissner | 343/742 |
| 2006/0022827 A1 | 2/2006 | Higham | 340/572.1 |
| 2006/0081705 A1 | 4/2006 | Linton et al. | |
| 2006/0214864 A1 | 9/2006 | Rahim | |
| 2006/0244599 A1 | 11/2006 | Taylor et al. | |
| 2006/0289650 A1 | 12/2006 | Taylor et al. | |
| 2007/0069018 A1 | 3/2007 | Dearing et al. | |
| 2007/0108273 A1 | 5/2007 | Harper et al. | |
| 2008/0100527 A1 | 5/2008 | Rahim | |
| 2008/0116269 A1 | 5/2008 | Dearing et al. | |
| 2008/0121700 A1 | 5/2008 | Dearing et al. | |
| 2008/0135613 A1 | 6/2008 | Dearing et al. | |
| 2008/0224875 A1 | 9/2008 | Phillips et al. | |

FOREIGN PATENT DOCUMENTS

| | | |
|---|---|---|
| CA | 2425189 | 5/2002 |
| CN | 1230270 | 9/1999 |
| DE | 299 12 346 U1 | 12/1999 |
| EP | 0 632 288 | 1/1995 |
| EP | 0632288 | 1/1995 |
| EP | 0 722 590 B1 | 7/1996 |
| EP | 1679636 | 7/2006 |
| EP | 1701296 | 9/2006 |
| GB | 2 333 095 A | 7/1999 |
| JP | 51-122498 | 10/1976 |
| JP | 07-230584 | 8/1995 |
| JP | 07-302284 | 11/1995 |
| JP | 10-316210 | 12/1998 |
| JP | 11-085858 | 3/1999 |
| JP | 11-130213 | 5/1999 |
| JP | 11-283123 | 10/1999 |
| JP | 2000-137758 | 5/2000 |
| JP | 2000-251156 | 9/2000 |
| JP | 2000-276335 | 10/2000 |
| JP | 2000-310476 | 11/2000 |
| JP | 2001-052054 | 2/2001 |
| JP | 2001-097512 | 4/2001 |
| JP | 2001-160162 | 6/2001 |
| JP | 2001-229263 | 8/2001 |

| | | |
|---|---|---|
| JP | 2001-317859 | 11/2001 |
| JP | 2001-317862 | 11/2001 |
| JP | 2002-032865 | 1/2002 |
| JP | 2002-056244 | 2/2002 |
| KR | 1993-0005285 | 3/1993 |
| KR | 1996-0002892 Y1 | 4/1996 |
| KR | 10-0184972 B1 | 5/1999 |
| KR | 2001-0022226 | 3/2001 |
| KR | 2001-0022227 | 3/2001 |
| KR | 2001-0072457 | 7/2001 |
| KR | 10-0766679 | 10/2007 |
| RU | 2 161 329 C2 | 12/2000 |
| RU | 2 168 761 C1 | 6/2001 |
| WO | WO 95/25423 | 9/1995 |
| WO | WO 96/12254 | 4/1996 |
| WO | WO 97/24689 | 7/1997 |
| WO | WO 97/29729 | 8/1997 |
| WO | WO 98/26746 | 6/1998 |
| WO | WO 98/52168 | 11/1998 |
| WO | WO 99/05659 | 2/1999 |
| WO | WO 99/05660 | 2/1999 |
| WO | WO 99/12122 | 3/1999 |
| WO | WO 99/45493 | 9/1999 |
| WO | WO 99/45494 | 9/1999 |
| WO | WO 99/45495 | 9/1999 |
| WO | WO 99/46940 | 9/1999 |
| WO | WO 99/49337 | 9/1999 |
| WO | WO 99/52723 | 10/1999 |
| WO | WO 99/57837 | 11/1999 |
| WO | WO 99/60512 | 11/1999 |
| WO | WO 99/62196 | 12/1999 |
| WO | WO 99/67735 | 12/1999 |
| WO | WO 00/03352 | 1/2000 |
| WO | WO 00/04485 | 1/2000 |
| WO | WO 00/04520 | 1/2000 |
| WO | WO 00/45324 | 8/2000 |
| WO | WO 01/55931 A1 | 8/2001 |
| WO | WO 01/94016 | 12/2001 |
| WO | WO 01/94016 A1 | 12/2001 |
| WO | WO 01/95243 | 12/2001 |
| WO | WO 02/01467 A2 | 1/2002 |
| WO | WO 02/03230 A1 | 1/2002 |
| WO | WO 02/08939 | 1/2002 |
| WO | WO 02/19251 A1 | 3/2002 |
| WO | WO 02/31629 A2 | 4/2002 |
| WO | WO 02/33511 A2 | 4/2002 |
| WO | WO 02/35432 A1 | 5/2002 |
| WO | WO 03/026724 | 4/2003 |
| WO | WO 03/026724 A1 | 4/2003 |
| WO | WO 03/073201 | 9/2003 |
| WO | WO 03/073225 | 9/2003 |
| WO | WO 03/073225 A2 | 9/2003 |
| WO | WO 03/087868 | 10/2003 |
| WO | WO 03/087868 A2 | 10/2003 |
| WO | WO 2005/013496 | 2/2005 |
| WO | WO 2007/142645 | 12/2007 |
| WO | WO 2008/115784 | 9/2008 |

OTHER PUBLICATIONS

Dec. 12, 2006 Japanese Official Action in Japanese Patent Appln. No. 2002-538343 (with partial translation).
Jan. 3, 2007 European Official Action in European Patent Appln. No. 01 919 848.7.
Feb. 15, 2007 Communication in Korean Patent Application No. 7027537/2006 (with English-language translation).
May 18, 2007 Communication in Korean Patent Application No. 7013101/2004 (with English-language translation).
Jun. 25, 2007 Official Action in Korean Patent Appln. No. 45389/2007 (with partial translation).
Jun. 25, 2007 Official Action in Korean Patent Appln. No. 45392/2007 (with partial translation).
Jun. 25, 2007 Official Action in Korean Patent Appln. No. 45394/2007 (with partial translation).
Jun. 25, 2007 Official Action in Korean Patent Appln. No. 45396/2007 (with partial translation).
Aug. 6, 2007 Official Action in Korean Patent Appln. No. 45398/2007 (with partial translation).
Jun. 22, 2007 Official Action in Japanese Patent Appln. No. 2003-571829 (with partial translation).
Aug. 22, 2007 Official Action in Mexican Patent Appln. No. Pa/a/008056 (with partial translation).
Jul. 27, 2007 Official Action in Australian Patent Appln. No. 2006252255, with attached Oct. 23, 2003 International Preliminary Examination Report.
Partial Translation of Russian Decision on Grant in Russian Patent Appln. No. 2004128075.
Sep. 3, 2007 Official Action in Japanese Patent Appln. No. 2002-538343 (with partial translation).
Sep. 13, 2007 Official Action in European Patent Appln. No. 06 023 373.1.
Declaration of Edward W. Burnham dated May 12, 2003.
Rosen, Cheryl, "The Fast Track," InformationWeek.Com, Jun. 18, 2001.
Woodyard, Chris, "Chips to Improve Baggage-Check Efficiency," Nov. 27, 2000, USA Today, Gannett Co., Inc.
Wigglesworth, Zeke, "SFO Installing First-in-U.S. Security System," San Jose Mercury News, Feb. 18, 2001.
Siedsma, Andrea, "SCS Aims to Make Skies Friendlier for Air Travelers," Feb. 23, 2001.
Brakeman, Lynne, "RFID Baggage Tracking Solution Helps Keep SFIA Secure," Jul. 1, 2001.
"Mobil Speedpass Makes Gasoline Purchase Virtually Effortless", Business Wire, Feb. 19, 1997, Copyright 1997 Business Wire, Inc., Business Wire, pp. 1-2.
"Technical report for RFID systems operating in the 2.45 GHz ISM band", Jul. 4, 1999, revised Aug. 19, 1999, pp. 1-51.
"Air Interfaces: Communications and Interfaces: Part B: Parameter Values for 2.45 GHz Narrow Band RFID Systems", Jun. 1, 1999.
"Radio Frequency Identification System-13.56 MHz", Feb. 7, 1997, pp. 1-20.
"Comments on the joint proposal by Gemplus and Checkpoint for a universal wake-up command (at 13.56MHz)", Alain Berthon, Texas Instruments, May 17, 2000, pp. 1-3.
"Field Re-progammable Item Management Air Interface Standard Proposal for 13,56 MHz," Gemplus 13 MHZ Air Interface Proposal, ISO/SC31/WG4/SG3 Gemplus NP, Jun. 21, 1999.
"13.56MHz Air Interface Proposal," Checkpoint systems, Inc. and Microchip Technology, Inc., Aug. 11, 1999.
"Multiple Frequency Anti-collision Protocol," Inferneon Technologies AG, ISO/8EC JTC 1/SC31 Workung Group 4— Radio Frequency Identification for Item Management, Mar. 23, 2000.
Moore, Bert, "RFID May Yet Prove Its Mettle on Metal," Frontline Solutions, Apr. 2001.
Senger, Nancy, "Making Airlines Safer With RFID," Business Solutions, Mar. 2000.
Sharp, Kevin, "This 'Killer App' Can Save Lives," ID Systems, Feb. 2000, Inc.
Binzoni, et al., "SCS Corporation Announces Radio Frequency Identification Installation At A Major Airport.", Oct. 5, 1999.
Russian Official Action in Russian Application No. 2004128075 (with English language translation).
Apr. 13, 2006 Supplementary Partial European Search Report in European Application No. 03713485.
Jul. 14, 2006 Supplementary European Search Report in European Application No. 03713485.5.
Aug. 15, 2006 Canadian Official Action in Canadian Patent Appln. No. 2,425,189.
Sep. 11, 2006 Australian Written Opinion with Oct. 2, 2006 Singapore communication in Singapore Patent Appln. No. 200403954-1.
Apr. 18, 2008 Korean Official Action in Korean Patent Appln. No. 7000578/2008 (with translation).
Nov. 28, 2008 Official Action in Australian Patent Appln. No. 2006220406.

Feb. 7, 2008 Official Communication in European Patent Appln. No. 03 713 485.5-1238.
Dec. 14, 2007 Mexican Official Action translation in Mexican Patent Appln. No. PA/a/2004/008056.
Mar. 6, 2008 Mexican Official Action translation in Mexican Patent Appln. No. PA/a/2004/008056.
Dec. 24, 2007 Korean Official Action in Korean Patent Appln. No. 45392/2007 (with translation).
Dec. 27, 2007 Korean Official Action in Korean Patent Appln. No. 45396/2007 (with translation).
Dec. 24, 2007 Korean Official Action in Korean Patent Appln. No. 45394/2007 (with translation).
Nov. 13, 2007 Korean Official Action in Korean Patent Appln. No. 7013101/2004 (with translation).
Dec. 24, 2007 Korean Official Action in Korean Patent Appln. No. 45389/2007 (with translation).
Feb. 11, 2008 Korean Official Action in Korean Patent Appln. No. 45398/2007 (with translation).
Oct. 11, 2007 Canadian Official Action in Canadian Patent Appln. No. 2,425,189.
Feb. 27, 2008 Korean Official Action in Korean Patent Appln. No. 45389/2007 (with translation).
May 3, 2005 Official Action in U.S. Appl. No. 10/209,348.
Nov. 23, 2004 Official Action in European Patent Appln. No. 01 979 848.7.
Jan. 17, 2005 Official Action in Canadian Patent Appln. No. 2,425,189.
Aug. 1, 2003 International Search Report in International Patent Appln. No. PCT/US02/40967.
Sep. 13, 2004 Supplementary Search Report in European Patent Appln. No. 01 979 848.7.
Oct. 20, 2003 International Search Report in International Patent Appln. No. PCT/US03/04653.
May 20, 2005 Preliminary Examination Report in International Patent Appln. No. PCT/US03/04653.
Jan. 27, 2006 Official Action in U.S. Appl. No. 10/870,938.
Aug. 8, 2005 Official Action in U.S. Appl. No. 10/870,938.
Feb. 3, 2006 Official Action in U.S. Appl. No. 10/795,386.
Jul. 14, 2005 Official Action in U.S. Appl. No. 10/795,386.
Jan. 28, 2005 Official Action in U.S. Appl. No. 10/795,386.
Mar. 21, 2006 Official Action in U.S. Appl. No. 10/209,348.
Nov. 22, 2006 Official Action in U.S. Appl. No. 10/870,946.
Oct. 4, 2007 Official Action in Singapore Patent Appln. No. 200403954-1.
Dec. 31, 2008 First Examination Report in Indian Patent Appln. No. 969/KOLNP/2004.
Mar. 5, 2009 Canadian Official Action in Canadian Patent Appln. No. 2,425,189.
May 22, 2009 Chinese Official Action in Chinese Patent Appln. No. 03804323.8 (with translation).
Japanese Patent Office Action for Application No. 2007-326923 dated Dec. 24, 2009 (3 pages) English translation only.
United States Patent Office Action for U.S. Appl. No. 10/862,456 dated Dec. 24, 2009 (7 pages).
United States Patent Office Action for U.S. Appl. No. 12/508,758 dated Dec. 30, 2009 (19 pages).
Chinese Patent Office Action for Application No. 03804323.8 dated Mar. 1, 2010 (11 pages).
Godinez, V., "RFID tracks hospital's devices," The Dallas Morning News (Apr. 28, 2007) 3 pages.
Mobile Aspects, Inc., "Case study: expiration management—for Organization King's Daughters Medical Center," (2007) 1-2.
Mobile Aspects, Inc., "Hands free through RFID," File Aspects/Solutions/Hands Free through RFID, www.mobileaspects.com (2008) 1 page.
Mobile Aspects, Inc., "iRISite™", File Aspects/Solutions/IRISite, www.mobileaspects.com (2008) 1 page.
Mobile Aspects, Inc., "iRISMed™", File Aspects/Solutions/IRISMed, www.mobileaspects.com (2008) 1 page.
Mobile Aspects, Inc., "iRISupply™", File Aspects/Solutions/IRISupply, www.mobileaspects.com (2008) 1 page.
Mobile Aspects, Inc., "iRISynergy™", File Aspects/Solutions/IRISynergy, www.mobileaspects.com (2008) 1 page.
Mobile Aspects, Inc., "Supporting the needs of the surgical specialty environment automating inventory management with RFID-enabled technology" (2007) 2 pages.
Multiple Antenna Reader System (MARS), MARS-24 (2007) 2 pages).
Nalepa, D., "Inventory management and recall capabilities with RFID technology," Cath Lab Digest, (2007) 15(3):40-42.
WinWare, Inc., "Winware releases the Accu-Cab RFID inventory management storage cabinet," Jun. 23, 2006, 1 page.
WinWare, Inc., CribMaster—AccuCab RFID, RFID Point of Use Dispensing "CribMaster Accu-Cab" brochure, 1 page.
Australian Patent Office Examination Report for Application No. 2002211769 dated Mar. 31, 2006 (2 pages).
Australian Patent Office Examination Report for Application No. 2003217534 dated Sep. 7, 2006 (2 pages).
Canadian Patent Office Action-for Application No. 2,474,183 dated Sep. 25, 2009 (3 pages).
Chinese Patent Office Action for Application No. 03804323.8 dated Dec. 12, 2008 (7 pages), translation only.
Chinese Patent Office Action for Application No. 03804323.8 dated Sep. 11, 2009 (7 pages).
Indian Patent Examination Report for Application No. 969/KOLNP/2004 dated Dec. 31, 2008 (3 pages).
International Preliminary Report on Patentability for Application No. PCT/US01/32230 dated Aug. 9, 2002 (4 pages).
International Search Report for Application No. PCT/US01/32230 dated Dec. 28, 2001 (3 pages).
International Search Report and Written Opinion for Application No. PCT/US2008/056981 dated Sep. 4, 2008 (9 pages).
Japanese Patent Office Action for Application No. 2002-538343 dated Sep. 3, 2007 (2 pages) with translation.
Japanese Patent Office Action for Application No. 2007-061714, translation only (drafted Sep. 9, 2009) 4 pages).
Japanese Patent Office Action for Application No. 2003-571829 dated Jul. 9, 2008 (1 page), translation.
Korean Patent Office Action for Application No. 7013101/2004 dated Nov. 21, 2006 (6 pages).
Mexican Patent Office Action for Application No. PA/a/2004/008056 dated Aug. 8, 2008 (4 pages) translation.
Russian Patent Office Action for Application No. 2008111640 with response due Oct. 2, 2009 (3 pages) translation only.
Singapore Patent Office Examination Report for Application No. 200403954-1 dated Jun. 26, 2008 (4 pages).
United States Patent Office Action for U.S. Appl. No. 09/981,219 dated Apr. 9, 2003 (16 pages).
United States Patent Office Action for U.S. Appl. No. 10/080,330 dated Jun. 5, 2003 (14 pages).
United States Patent Office Action for U.S. Appl. No. 10/080,330 dated May 5, 2004 (5 pages).
United States Patent Office Action for U.S. Appl. No. 10/209,348 dated Oct. 15, 2004 (8 pages).
United States Patent Office Action for U.S. Appl. No. 10/795,386 dated Jul. 3, 2006 (8 pages).
United States Patent Office Action for U.S. Appl. No. 10/795,386 dated Apr. 13, 2007 (8 pages).
United States Patent Office Action for U.S. Appl. No. 10/795,386 dated Dec. 22, 2006 (7 pages).
United States Patent Office Action for U.S. Appl. No. 10/862,456 dated Dec. 10, 2008 (8 pages).
United States Patent Office Action for U.S. Appl. No. 10/862,456 dated Jan. 22, 2008 (6 pages).
United States Patent Office Action for U.S. Appl. No. 10/862,456 dated Jul. 2, 2008 (8 pages).
United States Patent Office Action for U.S. Appl. No. 10/862,456 dated Jun. 10, 2009 (7 pages).
United States Patent Office Action for U.S. Appl. No. 10/862,456 dated Jun. 8, 2006 (11 pages).
United States Patent Office Action for U.S. Appl. No. 10/862,456 dated Mar. 14, 2007 (11 pages).
United States Patent Notice of Allowance for U.S. Appl. No. 10/870,938 dated Aug. 10, 2006 (7 pages).
United States Patent Office Action for U.S. Appl. No. 10/870,946 dated May 31, 2006 (11 pages).

United States Patent Office Action for U.S. Appl. No. 10/870,946 dated May 1, 2007 (13 pages).
United States Patent Office Action for U.S. Appl. No. 10/870,946 dated Oct. 15, 2007 (14 pages).
United States Patent Office Action for U.S. Appl. No. 10/874,264 dated Apr. 29, 2008 (7 pages).
United States Patent Office Action for U.S. Appl. No. 10/874,264 dated Aug. 15, 2006 (10 pages).
United States Patent Office Action for U.S. Appl. No. 10/874,264 dated Aug. 28, 2009 (8 pages).
United States Patent Office Action for U.S. Appl. No. 10/874,264 dated Feb. 24, 2006 (6 pages).
United States Patent Office Action for U.S. Appl. No. 10/874,264 dated Feb. 7, 2007 (9 pages).
United States Patent Office Action for U.S. Appl. No. 10/874,264 dated Jul. 12, 2007 (8 pages).
United States Patent Office Action for U.S. Appl. No. 10/874,264 dated Mar. 12, 2009 (8 pages).
United States Patent Office Action for U.S. Appl. No. 10/874,264 dated Nov. 13, 2007 (8 pages).
United States Patent Office Action for U.S. Appl. No. 10/874,264 dated Oct. 2, 2008 (8 pages).
United States Patent Office Action for U.S. Appl. No. 10/953,368 dated Jan. 8, 2008 (7 pages).
United States Patent Office Action for U.S. Appl. No. 10/953,369 dated Nov. 17, 2005 (5 pages).
United States Patent Office Action for U.S. Appl. No. 10/953,369 dated Apr. 17, 2006 (8 pages).
United States Patent Office Action for U.S. Appl. No. 10/953,369 dated Mar. 29, 2007 (5 pages).
United States Patent Office Action for U.S. Appl. No. 10/953,390 dated Jun. 1, 2006 (11 pages).
United States Patent Office Action for U.S. Appl. No. 10/953,390 dated Feb. 14, 2007 (11 pages).
United States Patent Office Action for U.S. Appl. No. 10/953,390 dated Sep. 5, 2007 (9 pages).
United States Patent Office Action for U.S. Appl. No. 10/953,390 dated Nov. 15, 2007 (7 pages).
United States Patent Notice of Allowance for U.S. Appl. No. 10/954,612 dated Mar. 10, 2006 (5 pages).
United States Patent Notice of Allowance for U.S. Appl. No. 10/954,612 dated Aug. 25, 2006 (5 pages).
United States Patent Notice of Allowance for U.S. Appl. No. 10/954,612 dated Aug. 14, 2007 (5 pages).
United States Patent Notice of Allowance for U.S. Appl. No. 10/954,612 dated Oct. 29, 2007 (5 pages).
United States Patent Office Action for U.S. Appl. No. 10/954,612 dated Dec. 11, 2007 (7 pages).
United States Patent Office Action for U.S. Appl. No. 10/954,612 dated Apr. 16, 2008 (7 pages).
United States Patent Office Action for U.S. Appl. No. 10/954,612 dated Oct. 20, 2008 (6 pages).
United States Patent Office Action for U.S. Appl. No. 11/247,253 dated Apr. 15, 2008 (8 pages).
United States Patent Office Action for U.S. Appl. No. 11/247,253 dated Dec. 31, 2007 (6 pages).
United States Patent Office Action for U.S. Appl. No. 11/247,253 dated Feb. 7, 2007 (7 pages).
United States Patent Office Action for U.S. Appl. No. 11/247,253 dated May 24, 2008 (6 pages).
United States Patent Office Action for U.S. Appl. No. 11/559,231 dated Oct. 19, 2009 (17 pages).
United States Patent Office Action for U.S. Appl. No. 11/687,272 dated Apr. 17, 2009 (10 pages).
United States Patent Office Action for U.S. Appl. No. 11/979,124 dated Jun. 18, 2009 (9 pages).
United States Patent Office Action for U.S. Appl. No. 11/980,559 dated Jun. 19, 2009 (9 pages).
United States Patent Office Action for U.S. Appl. No. 11/980,559 dated Nov. 5, 2009 (9 pages).
Written Opinion for International Application No. PCT/US03/04653 dated Nov. 10, 2004 (4 pages).
United States Patent Office Notice of Allowance for U.S. Appl. No. 11/559,231 dated May 21, 2010 (5 pages).
Canadian Patent Office Action for Application No. 2425189 dated May 11, 2010 (3 pages).

* cited by examiner

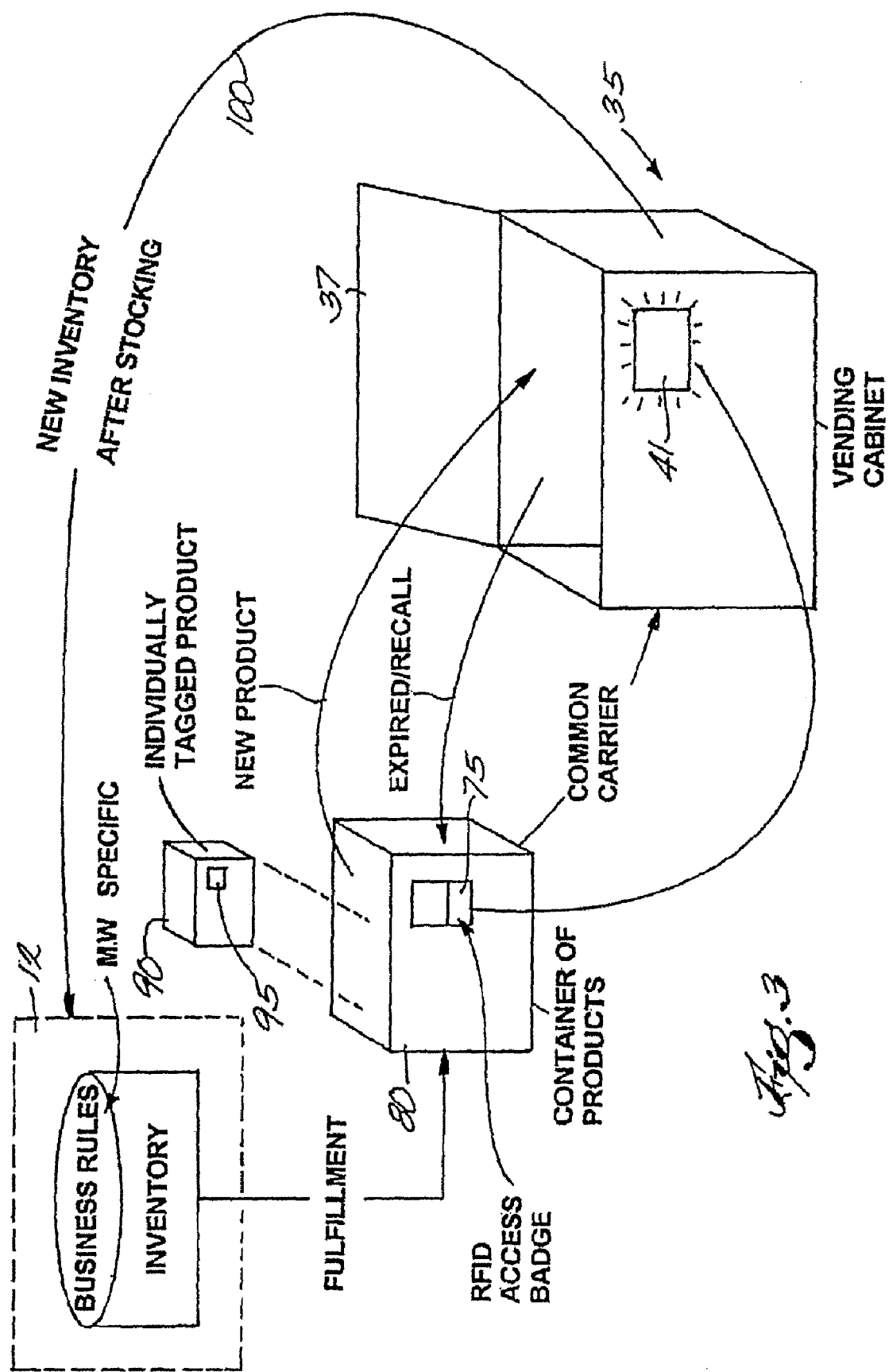

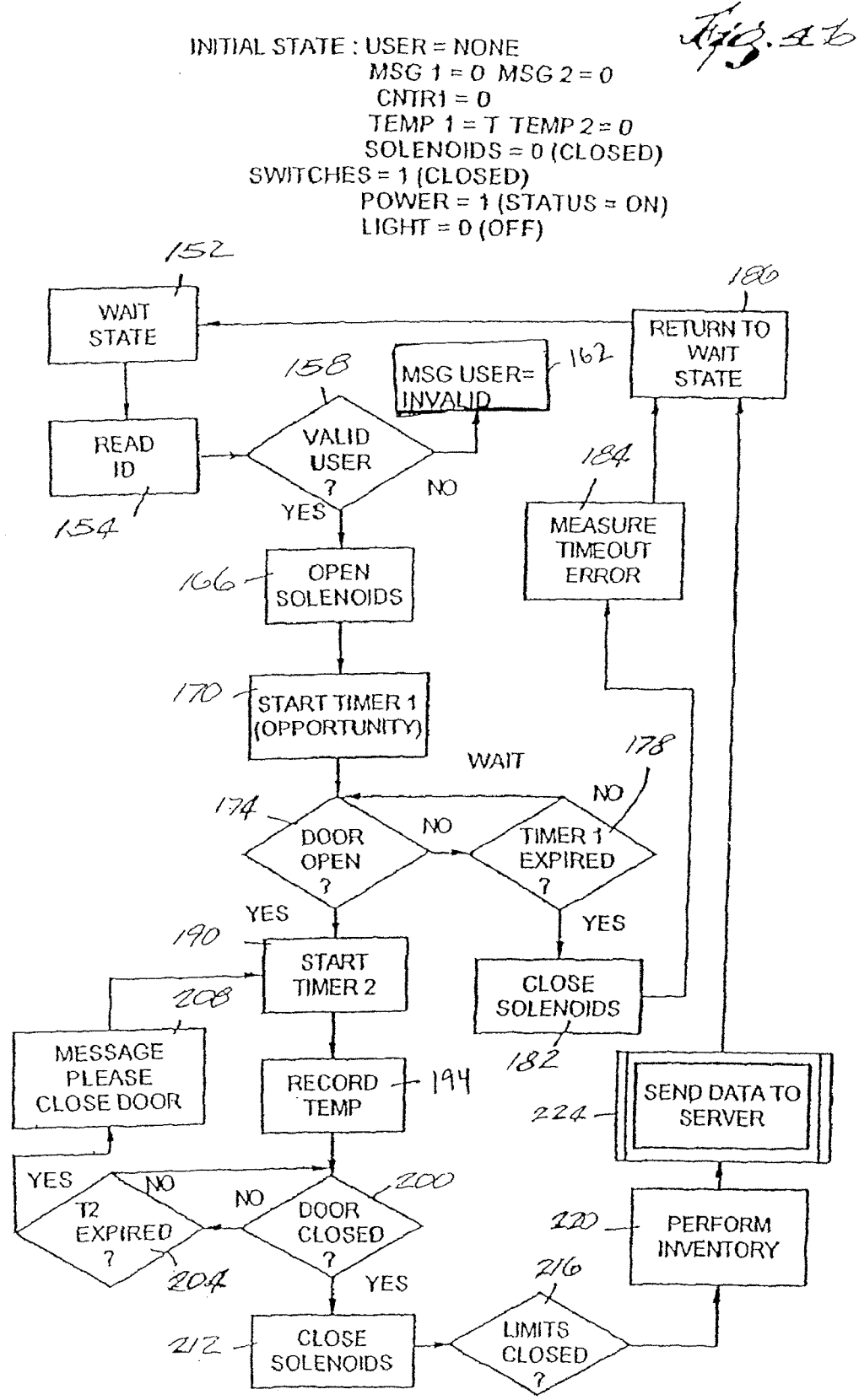

RADIO FREQUENCY IDENTIFICATION METHOD AND SYSTEM OF DISTRIBUTING PRODUCTS

This application is a division of application Ser. No. 09/981,219 filed Oct. 16, 2001, which claims the benefit of U.S. Provisional Application No. 60/241,907 filed Oct. 20, 2000.

BACKGROUND OF THE INVENTION

The present invention relates to methods and systems for distributing products to customers. More particularly, the invention relates to a method and system that tracks the use of products using radio frequency tags and provides information to a central computer to enable automated restocking, inventory, tracking, or reordering of the products.

The Internet, EDI, and similar systems permit businesses and ordinary consumers to order goods. However, the delivery of those goods still depends on distribution systems that are based in the physical world. The science-fiction ideal of being able to instantly have goods pop out of a computer or to receive them through a "transporter" or some other device has not yet been realized, and probably will not for many, many years. Presently, consumers may have goods shipped via various overnight delivery services. One drawback of present delivery technology is that it is primarily paper-based. Orders are made on paper and delivery involves shipping invoices, receipts, and other paperwork, which is costly to handle and annoying to many people. Even with technology that is not paper-based, ordering and receiving goods requires a number of steps. For example, for a typical Internet order, a consumer must view the applicable Web site, select the item, such as by clicking on an icon, fill out an electronic order form, and wait for the product to be delivered. Regardless of whether paper-based or electronic technology is used, present delivery methods usually require that the customer or his or her agent be present at a physical location to take the delivery of the ordered product. Further, delivery is usually made to a loading dock or similar location. This requires some internal distribution system to deliver the goods from the initial delivery point to the location where it is actually needed.

SUMMARY OF THE INVENTION

Accordingly, there is a need to improve the distribution of goods so that consumers experience distribution of goods at a location proximate to where the consumer will use the goods without requiring paper or computer ordering. There is also a need for a distribution system that requires less user intervention and data input than existing systems.

The invention provides a system and method where a user need only find the product of interest and take that product. As compared to most Internet-based systems and methods, the invention is "clickless." In other words, the invention requires little or no manual input from users. The invention provides a system for distributing a plurality of products. Each of the products has a radio frequency ("RF") tag. As used herein, radio frequency means electromagnetic radiation that lies between audible and infrared radiation. Each tag is encoded with a unique identifying code. In one embodiment, the system is designed to be accessed by individuals possessing a radio frequency user badge with an identifying code. Alternatively, the system could rely on magnetic swipe cards, password systems, biometric devices (such as a retinal scanner, thumbprint reader, voice identification unit, or the like), or other systems for limiting access to authorized individuals.

The system includes one or more cabinets, refrigerators, similar storage units, (generically referred to as "micro-warehouses") or even secured rooms that are stocked with the RF tagged products and accessed by individuals through one of the mechanisms described above. In one embodiment, each micro-warehouse has a door that may be equipped with a lock (Such as an electric actuated lock), an antenna or antenna array mounted on or in the micro-warehouse, a client controller coupled to the lock and the antenna, and an output device such as a light or display. Using a signal from the antenna or other input device, the client controller checks the identity of the individual accessing the micro-warehouse, such as by reading the code of the user badge. The output device is then activated to indicate whether the individual attempting to access the micro-warehouse is authorized to access the unit. If the code or other identifier matches stored records of authorized users, the client controller opens the door and the user may remove desired products from the micro-warehouse. Once the user closes the door, the client controller performs a scan of the products remaining in the micro-warehouse to determine the identity of each of the products. The client controller then generates a message including the identity of each of the products or other message related to the products taker), and sends that message to a server. The server tracks product and user information automatically, that is, without relying on user input. In particular, the server tracks product inventory, customer usage, restocking, usage frequency, faults, micro-warehouse temperature, timing, and other information. The server also generates orders for products taken from the micro-warehouse by the user. The server can be programmed to automatically place those orders, with the result that the system is "clickless." That is, the system eliminates the need for the customer to re-order consumed items.

In addition to the features noted above, the system may also locate the position or presence of one or more specific products in a micro-warehouse by conducting a scan of the micro-warehouse. In this way, the system can sense a disordered state of the product in the micro-warehouse. For example, the system can detect whether all of the components in a kit product are in the relevant kit box. Further, a product scan can detect whether any product in the micro-warehouse has been recalled, expired, or is otherwise not suitable for use. Upon detecting such a product, the system refuses access to the micro-warehouse until an administrator removes the product or otherwise addresses the situation.

The invention also provides a method of distributing a plurality of products from a micro-warehouse. The method may include fitting each product with a radio frequency identification tag, positioning the plurality of products in the micro-warehouse, sensing opening and closing of the micro-warehouse door, scanning the plurality of products in the micro-warehouse upon sensing closing of the door to determine the number and type of products in the micro-warehouse, generating a message based on the number and type of products in the micro-warehouse, transmitting the message to a remote processor or server, aud maintaining an inventory in the server based on the message.

The method and system permit up-to-date information to be provided to the server which, in turn, can be connected to ordering and manufacturing information systems to ensure prompt re-stocking of the micro-warehouses. The system can be designed with multiple levels of access. For example, multiple micro-warehouses may be located within a secure room and a user badge may be encoded to permit a user to access the room only, a limited number of warehouses in the room, or all the warehouses in the room.

As is apparent from the above, it is an advantage of the present invention to provide a method and system of identifying and distributing products. Other features and advantages of the present invention will become apparent by consideration of the detailed description and accompanying drawings.

BRIEF DESCRIPTION OF THE DRAWINGS

In the drawings:

FIG. 3 is an illustration of the flow of products and information in a distribution system of the invention

FIG. 4b is a flowchart of the software of the invention

DETAILED DESCRIPTION

Figure 1:
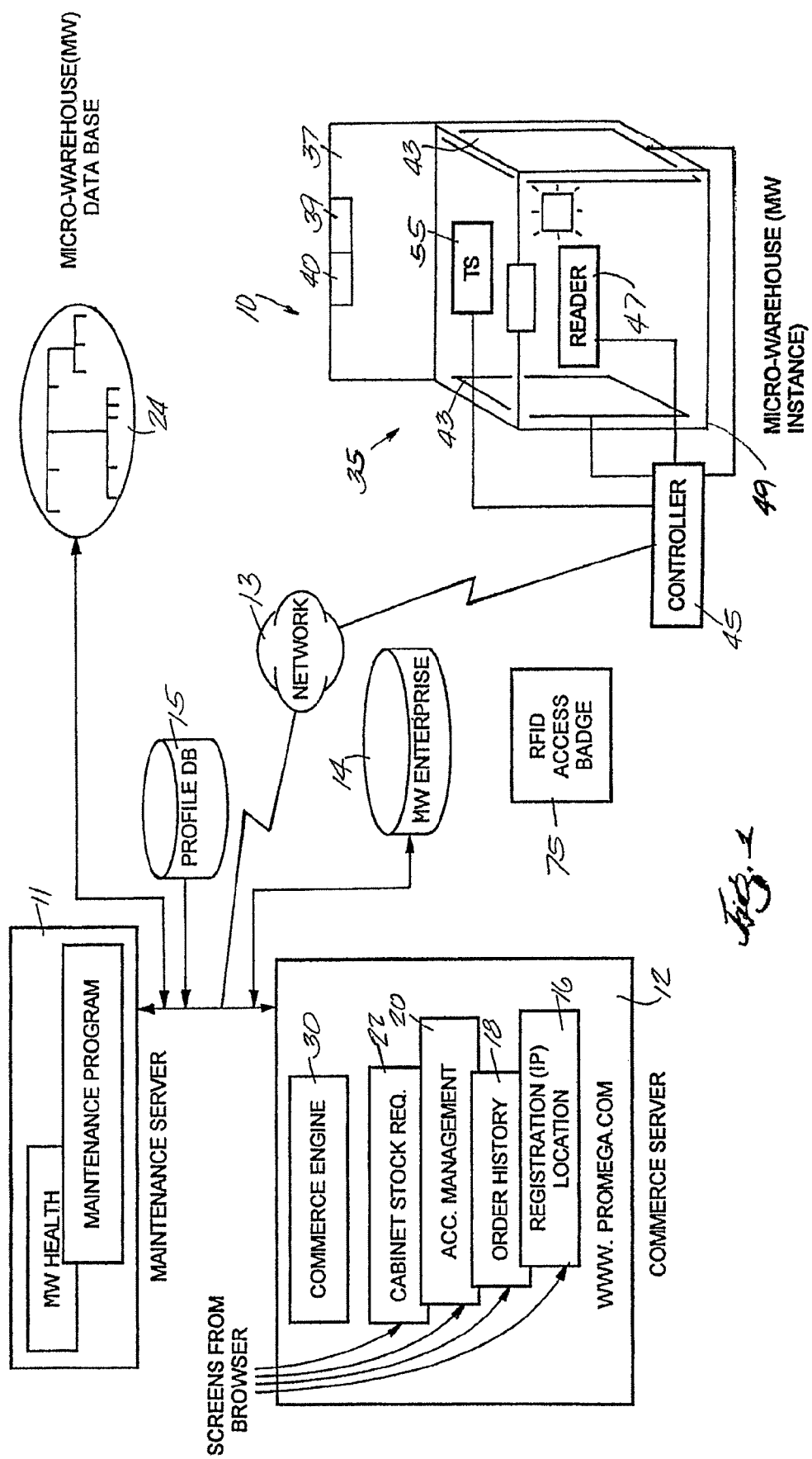
FIG. 1 is a schematic diagram of a system embodying the invention.

Before the invention is explained in detail it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a system 10 embodying the invention. The system 10 includes two servers (maintenance and commerce) 11 and 12 that create and maintain user lists, perform inventory, account, ordering functions, and monitoring functions, such as microwarehouse status, monitoring temperature and other faults. Servers 11 and 12 may communicate with a client (discussed below) using standard protocols such as TCP/IP, or other protocols over a network 13. The network 13 may be the Internet, a telephone network, a wireless network, power line carrier ("PLC") network, or combinations thereof. Servers 11 and 12 include standard hardware and operating system software (not shown). Running on top of the hardware and operating system software is a micro-warehouse ("MW") enterprise application 14. The MW enterprise application 14 accesses a profile database 15 that includes a registration module 16, an order history module 18, an account set-up module 20, and a stock request module 22. Each of the modules 16-22 is maintained for each client coupled to the server 12. The modules may be configured with web content designed to be accessible using protocols for the World Wide Web section of the Internet.

Figure 2:
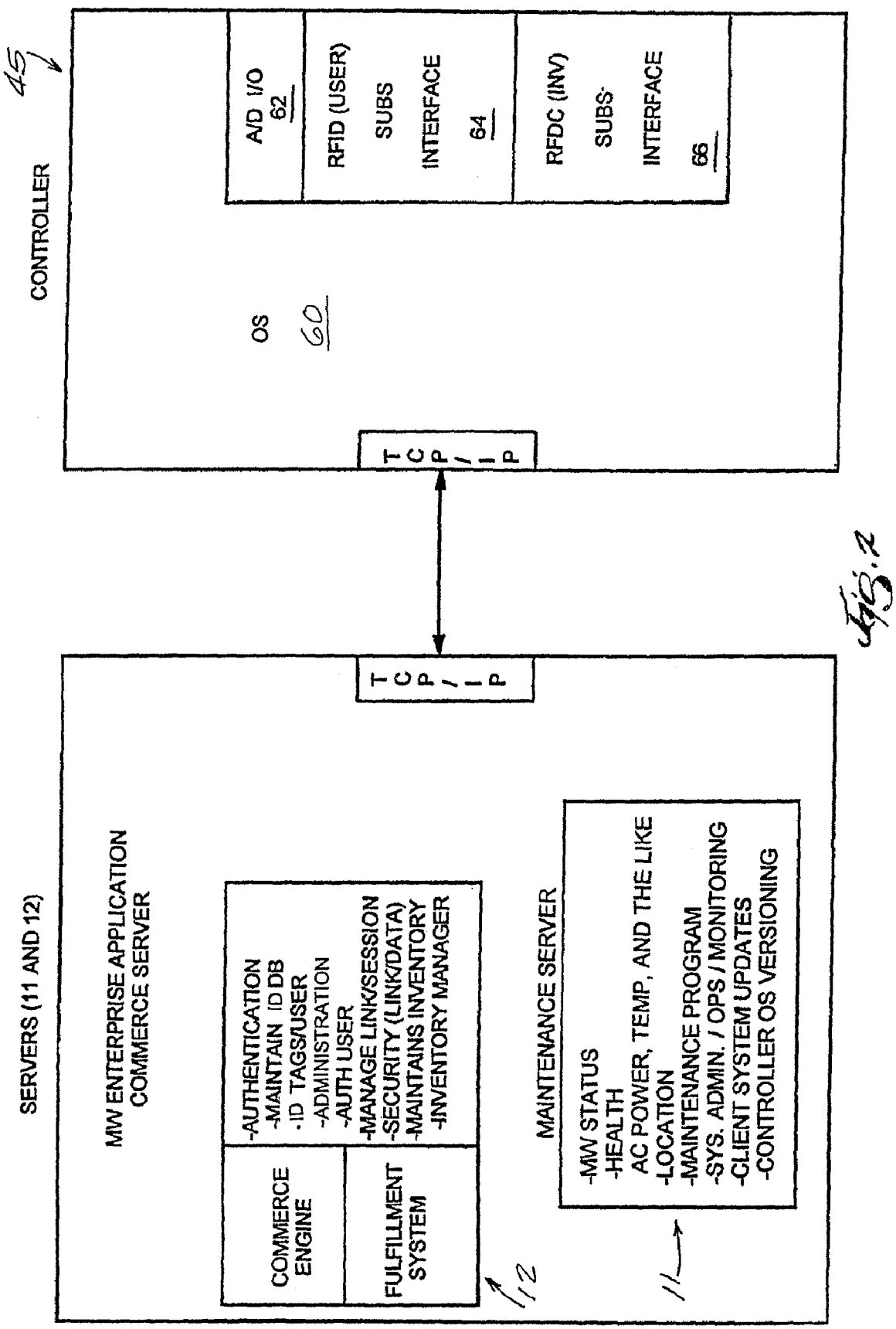
FIG. 2 is schematic diagram of the server and client controller of the system shown in FIG. 1 illustrating the architecture of the enterprise application of the server and the architecture of the software on the client controller.

As best seen by reference to FIG. 2, the MW enterprise application 14 performs numerous functions. Broadly, the MW enterprise application 14 controls the arrangement of the RFID user badges (discussed below), manages communication sessions with clients connected to the server 12, maintains an inventory of products for each client connected to the servers 11 and 12, checks inventory of the MW and other local MWs before ordering a product, manages security of communications, provides system administration functionality, and monitors and maintains the health of clients connected to the servers.

The registration module 16 provides part of the inventory functionality of the server 12 by providing access to information regarding the location of clients connected to the server 12. In the invention, the clients take the form of MWs. The registration module also provides access to information regarding sales persons assigned to a particular MW and identification numbers for each MW. The registration module 16 may access a MW database 24.

The order history module 18 provides a history of orders for each MW and product preferences for each MW. The account set-up module provides administrative screens for payment authorization, user information, and similar information. The stock request module 22 controls inventory replenishment based on usage and on specific customer requests and similar information.

The server 12 also accesses a commerce engine 30 that uses information received from the client to generate orders that are delivered to the manufacturing infrastructure (not shown) that produces products to be distributed using the system and method of the invention. The information may be used by marketing, customer relation management ("CRM"), billing, and other systems and functions. For example, the invention may be used in the distribution of life science research products such as enzymes, assays, cloning vectors, component cells, and the like. (Of course, a wide variety of non-biological products could be distributed using the invention.) The information provided by the server 12 is used in the manufacturing infrastructure to ensure proper production of products according to the demand for such products. As noted above, the server 12 may be coupled to a plurality of clients. An exemplary client in the form of a MW 35 is shown in FIGS. 1 and 2. While only one client is shown, the number of clients connected to the server 12 is limited only by the server's internal capacity and the capacity of the network 13.

The MW 35 may take the form of a refrigerated cabinet, a freezer, or other storage container. A secured storeroom, similar location, or other defined area could also be outfitted with a client controller and other components, as described herein, and be used to store products. As shown, the MW 35 includes a door 37, an electric actuated lock 39 and/or a proximity sensor 40, and an output device that may take the form of audio device or light 41. Other output devices such as a voice synthesis device, a display screen, and the like may also be used. The MW 35 is configured with an antenna array 43. The antenna array 43 is coupled to a client controller 45. In one embodiment, the invention may include an antenna with two vertically polarized array antennas. The antenna 43 is an RF receive and transmit device which communicates with a transponder device or tag (discussed in greater detail below). In one embodiment, the tag is a passive tag and powered by energy from the antenna.

The MW 35 may include a specialized card reader 47 in the form of a magnetic card swipe device, an antenna, a fingerprint reader, or similar device. The specialized card reader 47 is coupled to the client controller 45 via a communication link 49. The MW 35 may also include an internal and ambient temperature sensor 55. If included, the temperature sensor 55 is preferably positioned such that it can sense the temperature of the interior of the MW 35. The temperature sensor 55 is coupled to the client controller 45 to provide temperature information to the client controller. Additional information may be provided to the client controller through optional input devices. The location of the MW 35 may be monitored by a global positioning system (GPS) device (not shown) plus inertial frame recognition for fine measurement and for interpolation between GPS satellite acquisitions. The voltage, frequency, and other characteristics of electrical supply lines may be monitored and provided to the client controller 45 by a power line monitoring device (also not shown). Additional input devices, such as cameras, microphones, sensors, etc., could be coupled to the client controller to monitor environmental and other conditions.

The client controller 45 includes software to carry out several functions. The software included on the client controller 45 may be better understood by reference to FIG. 2. As shown, the client controller 45 includes an operating system 60. The operating system 60 is dependent on the type of processor used in the client controller. Preferably, the client controller 45 is an X86 single chip computer controller with a compatible operating system. If desired, the client controller 45 may be a consumer grade device such as a Palm Pilot personal digital assistant or Packet PC device, and modified according to the teachings herein. Depending on the hardware used, the client controller 45 may be configured with a graphical user interface ("GUI") to facilitate interaction between the system 10 and its users.

The client controller 45 also includes an I/O interface 62, which may take the form of an analogue-digital, digital-analogue converter, digital input/output (ADC, DAC, and DIO) interface. The interface 62 handles input from the electric actuated lock 39, input from the temperature sensor 55, output to the electric actuated lock 39, and input from optional monitoring devices such as the GPS and power line monitoring devices.

In addition to the interface 62, the client controller 45 may have two other modules: an RFID user sensing subsystem 64 and a radio frequency data collector ("RFDC") inventory interface 66. The RFID user sensing subsystem 64 handles input and output to and from the specialized card reader 47. The RFDC inventory interface 66 handles input and output from the antenna 43 and handles links or sessions between the MW 35 and servers 11 and 12.

The client controller 45 includes software (not shown) which may incorporate the RFDC inventory interface 66 that reads the RFID signatures from tagged products (discussed below) placed inside the MW 35. The software may be implemented according to algorithms disclosed in International Publication No. WO99/45495 and International Publication No. WO99/45494, the disclosures of which are hereby incorporated by reference herein. The referenced publications teach identification systems that can identify a plurality of RFID tagged items using an interrogator. The interrogator sends signals from antennas and cooperates with passive, transponder RFID tags in such a way as to eliminate or reduce interference problems that are typically associated with reading RF signals from multiple devices. The system 10 could also be implemented with active tags, although presently available active tags need to be improved so as to perform in the temperatures that the system is expected to operate within and at roughly the same cost and power consumption.

Before the system 10 may be implemented, one or more RFID access badges 75 must be generated. Preferably, the RFID badges 75, as well as the other RFID tags (discussed below) are passive transponder tags such as the tags disclosed in the above-referenced international applications. Preferably, the RFID badges 75 are encoded with information from the account set-up module 20 based on digital signatures. In addition, it is preferred that the digital signatures encoded on the RFID badges 75 used by restocking services provide one-time access to a specific MW, and thereafter expire. The RFID access badges may be fixed on a carton of products 80. Alternatively, they may be delivered separately to the facility where the MW of interest is located.

The carton of products 80 includes a plurality of individual products 90 each with an identification tag 95. Each identification tag 95 may be the same as an RFID badge 75, except that the digital signature on tag 95 will generally not expire. In one form of the invention, each tag 95 has a 16-bit identification code and a 72-bit item identification code. The 16-bit identification tag may be programmed with information such as the manufacturer of the product. The 72-bit item identification code is used to provide descriptive information regarding the product such as serial number, product type, date, lot number, and similar information.

Once all the products 90 have been fitted with unique RFID tags 95, the products may be shipped in the carton 80 to a designated MW such as the MW 35. As shown in FIG. 3, the carton 80 is packed according to a fulfillment request that is based on either an initial order from a customer (not shown) or MW specific business rules followed by the server 12. The carton 80 may be fitted with RFID access badge 75 or the RFID access badge 75 may be shipped separately to the location of the MW of interest. If fitted with an RFID access badge 75, the carton 80 may be shipped by a delivery service contracted to deliver the package to the MW 35. Once the carton is delivered, the recipient or user may use the RFID access badge 75 to open the door 37 of the MW 35 by passing RFID access badge 75 in front of the reader 47. Client controller 45 reads the digital signature of the RFID access badge 75 and confirms reading of the code by actuating a user feedback device such as a voice synthesis module or the light 41. Since, the server 12 provides a locally based user list to die client controller 45, the client controller 45 oversees authentication of the digital code read from the RFID access badge 75. Client controller 45 checks the authenticity of the read code by matching the code to the user list. Client controller 45 may then optionally read the temperature sensors 55 and transmit temperature information to the server 11. Preferably, the temperature sensor is also read on a periodic basis, with the temperature information being transmitted to the server each time the temperature is read. Client controller 45 can also be programmed to transmit temperature data if the temperature falls beneath or above a predetermined range. In many instances, it will be important to ensure that the temperature of the MW is within an appropriate range to store the products 90. If the temperature of the MW 35 is within an appropriate range, and the user is authenticated, the client controller 45 then actuates the lock 39 to open the door 37 (of course, the MW need not be equipped with the lock 39). If the temperature of the MW 35 is not within an appropriate range, then access to the MW may be prevented by maintaining the lock 39 in a closed state. This would allow a refrigerated unit associated with the MW to cool the interior space of the MW to a desired temperature before ambient air was allowed into the MW by opening of the door. This also provides for product integrity during power failure Once the door 37 opens (which may be sensed by the proximity sensor 40), a communication session between the MW 35 and servers 12, which may be segmented based on appropriate events to optimize user response and network usage, begins. Having full access to the MW 35, the employee of a carrier or logistic service who delivered the carton 80 now proceeds to place the individual items 90 into the MW 35. Once the carton of products 80 is empty, the delivery employee then closes the door 37, and removes the carton, if necessary. The proximity sensor 40 senses the closing of the door 37. The client controller 45 senses the status of the sensor. Preferably, the lock 39 (if used) resets automatically after being unlocked for a predetermined time, for example five (5) seconds. The user has that predetermined time to open the door. The RFDC inventory interface 66 is disabled once the door 37 opens. When the door 37 closes, the RFDC inventory interface 66 is enabled and initiates a scan of the products placed within the MW 35. Upon completing the scan, the client controller 45 sends a change-in-inventory message 100 to the commerce server 12. To ensure integrity of the inventory change billed to the customer, the client controller 45 employs an integrity algorithm when the RFDC inventory interface 66 scans the MW 35. The algorithm is based on statistical information, historical information, and other factors including RF algorithms (frequency-hopping, etc.) and delay data.

The MW 35 may be accessed by a customer at the MW location using a separate RFID badge 75 shipped directly to that customer. Alternatively, and as noted above, the reader 47 may be configured as a magnetic card swipe device, barcode, a fingerprint reader, or some similar device that controls access to the MW 35. Regardless of its exact configuration, the reader 47 reads the input from the customer and acknowledges reading of that input by lighting the light 41. The client controller 45 then sends an input signal to the server 12. The server 12 then conducts an authenticity review of the input. If an authorized input is received, the server 12 sends an okay message to the MW 35. The client controller 45 may have the capability to authenticate the review as well. Once authentication takes place, the client controller 45 then opens the door 37 allowing the customer access to the interior of the MW 35. The customer then removes one or more products 90 from the interior of the MW and then closes the door 37. Once the door is closed, client controller 45 scans the remaining products in the MW 35 and sends a message containing the missing products to the server 12. Identifying which products have been taken, the server 12 compares the previous inventory prior to opening, to the inventory of the missing items. From the comparison, the server 12 determines the missing items in the MW 35. The inventory information is then communicated to the commerce engine 30, which stores the information for future use for both marketing and inventory functions. Receipts for the used products can then be emailed or printed and shipped via regular mail to the customer at the MW location. Invoicing can also occur using electronic and standard mechanisms.

The inventory message can be used for other purposes as well. For example, the inventory message includes information regarding individual products. Therefore, the amount of time a particular product spends in any MW may be recorded by the server, as well as the product's temperature history. If this time is recorded, it is also possible to compare the amount of time any particular product spends in a MW to a shelf life for that product. Temperature history can also be stored and compared to other data. If the shelf life is passed, then an expiration message, such as a pick list, may be generated and sent to the MW or an e-mail address of a user of the system to inform users of products that should be removed from the MW and not used. In addition, the inventory message may be used to determine the type of products in the MW 35. If any of the products present within the MW 35 are subject to a recall, the MW 35 may be placed in a "lock down" condition, whereby access to the MW is denied until an administrator or other authorized individual removes the recalled product or otherwise addresses the situation.

Figure 4A:
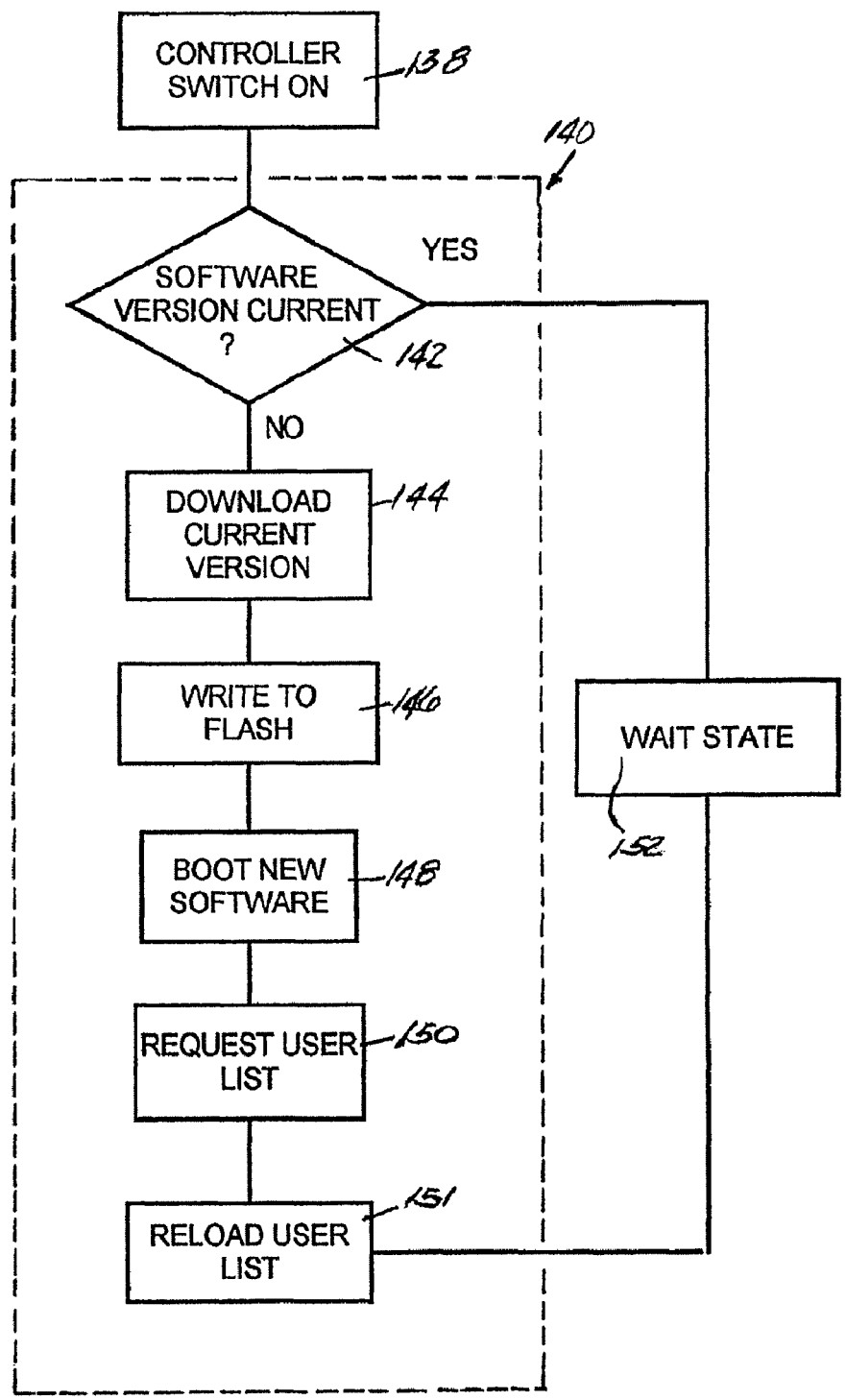
FIG. 4a is a flowchart of the software's boot up routine of the invention.

FIGS. 4a and 4b are flow charts of the software used in the invention. Once the client controller 45 is turned on in FIG. 4a at step 138, it executes a standard boot up routine at step) 140. Part of the standard boot up process enables the software to automatically update itself. At step 142, a message is sent to the maintenance server 11 to query the current version of the controller software. If the version on the server 11 is the same as the version on the client controller 45, the client controller 45 establishes a wait state as shown in step 152. If the version on the server 11 is newer than the version on the client controller 45, then the newer version is downloaded over the Internet, as shown at step) 144. The newer version is loaded into the alternative pocket or partition and written to flash memory, as shown at step 146. Then the software is booted, as shown at step 148. A garbage collection routine clears the old version. A message packet accompanies each boot to the maintenance server, including version status and operating status. Each boot then requests a reload of the list of authorized users from the server 11 at step 150. The list is then reloaded at step 151. As shown in FIG. 4b at step 152, the client controller 45 then establishes the wait state of the system by initializing various variables or objects such as a USER, MSG 1, MSG 2, CNT1, TEMP 1, TEMP 2, and SOLENOIDS. In addition, the client controller 45 initializes variables or objects SWITCHES, POWER, and LIGHT. Once initialization is complete, the unit is ready for user access. During this wait state, the client controller 45 performs periodic checks on the status of the MW 35. When a customer approaches the MW and presents an RFID badge, the client controller 45 reads the user RFID badge at step 154 and checks the validity of the identification code read from the badge at step 158. If the code does not match a valid code, an invalid user message is generated at step 162. The message may be displayed on an output device (not shown). If an optional lock is installed on the door of the MW 35, the client controller 45 then opens the solenoids in the lock on the MW 35, as shown at step 166, if the code is valid. An internal timer is then started, as shown at step 170. In one embodiment of the invention, the proximity sensor 40 is used to detect opening of the door 37 and the status of the door. Once the door opens, the proximity sensor 40 switches its status. At step 174, the client controller 45 checks to see if the door has been opened by reading the status of the proximity sensor 40. If the proximity sensor 40 has not changed status, the client controller 45 will continue to check for a predetermined amount of time, as shown at step 178. If the predetermined amount of time is exceeded, the solenoids are closed (step 182), which locks the lock 39, a timeout error message is generated (step 184), and the client controller 45 returns to the initial state, as shown at step 186.

If the door 37 is opened within the predetermined amount of time (currently set through practice at five (5) seconds), a second timer is started, as shown at step 190. The client controller 45 then records the internal temperature of the MW 35 at step) 194 and then checks to see if the door 37 has been closed at step 200. The client controller 45 continues to check for closing of the door for a predetermined amount of time, as shown at step 204. If the predetermined amount of time expires, a close door message is generated as shown at step 208 aid steps 190-204 are re-executed.

Once the door 37 is closed, the client controller 45 closes the solenoids, as shown at step 212. The client controller 45 then confirms that the door 37 is closed at step 216 and performs an inventory scan at step 220. The data from the inventory scan is then sent to the server 12, as shown at step 224. The client controller 45 then returns to the initial state (step 186).

In another embodiment, the system utilizes a defined area to enclose the tagged products rather than a cabinet. The defined area uses an access point to serve as its entryway. The products within the area are fitted with identification tags and specifically positioned in the area to be recognized by the RFDC inventory interface. Product scans begin when a sensor senses a user passing through the access point. The access point is controlled by a processor, such as the client controller 45, and is able to restrict access to the area and products, if necessary.

As can be seen from the above, the invention provides a method and system for distributing products. Various features and advantages of the invention are set forth in the following claims.

What is claimed is:

1. An apparatus comprising;
    a door;
    a sensor for sensing opening and closing of the door;
    an RFID scanning unit for scanning an interior of the apparatus;
    a controller for controlling operation of the RFID scanning unit;
    a software downloading unit configured to download, from a server via a network connection, software for controlling the apparatus;
    wherein a list of authorized users for the apparatus is automatically downloaded to the apparatus directly from the server via the network connection in response to a request by the software downloading unit, sent on the network connection when the apparatus is booting, that the list be downloaded;
    wherein authorization of a user is performed using the list, and the door of the apparatus is unlocked in response to the authorization;
    wherein, after the sensor senses the closing of the door, the RFID scanning unit scans the interior of the apparatus to detect presence of products, each product having been fitted with an RFID tag; and
    wherein a message based on a result of a scan by the RFID scanning unit is transmitted to the server for maintaining an inventory in the server based on the message.

2. The apparatus as claimed in claim 1, wherein a comparison is made by the apparatus between a version of software being used by the apparatus and a most recent version of software available, and wherein the software is downloaded in response to a determination that a new version of software is available.

3. The apparatus as claimed in claim 1, wherein the downloaded software is stored in flash memory.

4. The apparatus as claimed in claim 1, wherein the network connection for downloading the software is an Internet network connection.

5. The apparatus as claimed in claim 1, wherein the apparatus is a temperature-controlled cabinet.

6. The apparatus as claimed in claim 1, wherein the message is generated in accordance with a comparison between results of a first scan of the interior of the apparatus and a second scan of the interior of the apparatus.

7. The apparatus as claimed in claim 1, wherein the RFID scanning unit includes an antenna mounted in the apparatus, and wherein each product is fitted with a passive RFID tag.

8. The apparatus as claimed in claim 1, wherein the message indicates both number and type of the products.

9. A method for use with an apparatus including an antenna used for RFID scanning, the method comprising:
    downloading software to the apparatus, from a server to a network connection, for controlling the apparatus;
    downloading to the apparatus, automatically, a list of authorized users directly from the server via the network connection in response to a request by the apparatus, automatically sent in the network connection when the apparatus is booting, that the list be downloaded;
    performing authorization of a user using the list;
    unlocking a door of the apparatus in response to the authorization;
    sensing opening and closing of the door;
    scanning an interior of the apparatus using the antenna;
    controlling operation of the antenna wherein, after sensing the closing of the door, the antenna scans the interior of the apparatus to detect presence of products, each product having been fitted with an RFID tag; and
    transmitting a message based on a result of a scan by the antenna to the server to maintain an inventory in the server based on the message.

10. The method as claimed in claim 9, further comprising comparing, by the apparatus, a version of software being used by the apparatus and a most recent version of software available, wherein the software is downloaded in response to a determination that a new version of software is available.

11. The method as claimed in claim 9, further comprising storing the downloaded software in flash memory.

12. The method as claimed in claim 9, wherein the network connection for downloading the software is an Internet network connection.

13. The method as claimed in claim 9, wherein the apparatus is a temperature-controlled cabinet.

14. The method as claimed in claim 9, further comprising:
    performing a first scan of the interior of the apparatus;
    performing a second scan of the interior of the apparatus; and
    generating the message in accordance with a comparison between results of the first scan and the second scan.

15. The method as claimed in claim 9, wherein the message indicates both number and type of the products.

* * * * *